US012734938B2

(12) United States Patent
Vélez Cortés et al.

(10) Patent No.: US 12,734,938 B2
(45) Date of Patent: Sep. 15, 2026

(54) VEHICLE HAVING A CONTROLLED FOLDABLE SEAT

(71) Applicant: Ford Global Technologies, LLC, Dearborn, MI (US)

(72) Inventors: Eduardo Arturo Vélez Cortés, Mexico City (MX); Jorge De Jesús Piedras Rodríguez, Tultepec (MX); Ricardo Yair Ramos Téllez, Nezahualcoyotl (MX)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 18/785,680

(22) Filed: Jul. 26, 2024

(65) Prior Publication Data

US 2026/0027951 A1 Jan. 29, 2026

(51) Int. Cl.

| | |
|---|---|
| ***G07C 5/00*** | (2006.01) |
| ***B60N 2/02*** | (2006.01) |
| ***B60N 2/20*** | (2006.01) |
| ***G07C 5/02*** | (2006.01) |
| ***G07C 5/04*** | (2006.01) |
| ***G07C 5/08*** | (2006.01) |

(52) U.S. Cl.

CPC ......... *B60N 2/0244* (2013.01); *B60N 2/0226* (2023.08); *B60N 2/20* (2013.01)

(58) Field of Classification Search

CPC ...... G01S 5/021; G01S 5/0269; G01S 5/0294; G01S 7/40; G01S 13/765; G01P 15/02; G01P 15/18; B60N 2/0244; B60N 2/0226; B60N 2/20

See application file for complete search history.

(56) References Cited

U.S. PATENT DOCUMENTS

| | | | |
|---|---|---|---|
| 7,460,005 B2 | 12/2008 | Nathan et al. | |
| 7,965,170 B2 | 6/2011 | Nathan et al. | |
| 9,387,776 B2 | 7/2016 | Mayer et al. | |
| 10,214,118 B1 * | 2/2019 | Jain | B60N 2/002 |
| 11,731,546 B1 | 8/2023 | Wang et al. | |

(Continued)

FOREIGN PATENT DOCUMENTS

| | | | |
|---|---|---|---|
| GB | 2440240 B | 9/2009 | |
| KR | 20220149432 A | 11/2022 | |
| WO | WO-2006020069 A2 * | 2/2006 | B60N 2/0252 |

*Primary Examiner* — Kito R Robinson
*Assistant Examiner* — Anthony Gabriel Mora
(74) *Attorney, Agent, or Firm* — Vichit Chea; Price Heneveld LLP

(57) ABSTRACT

A vehicle having a seat with a seat base and seat back that folds from an upright seating position to a folded position, a user input to enter an input to move the seat back to the folded position, and at least one door moveable between open and closed positions. A door sensor detects the at least one door in the open or closed positions and a controller is configured to control movement of the seat back from the seating position to the folded position. The controller permits activation of the seat back to move to the folded position when the input is received, the at least one door is in the open position and the vehicle is determined not to be moving, and prevents movement of the seat back to the folded position when the vehicle is moving or the at least one door is in the closed position.

20 Claims, 7 Drawing Sheets

(56) References Cited

U.S. PATENT DOCUMENTS

| | | | | |
|---|---|---|---|---|
| 2005/0236881 | A1* | 10/2005 | Suda | B60N 2/3009 297/378.1 |
| 2007/0018839 | A1 | 1/2007 | Nathan et al. | |
| 2007/0296257 | A1* | 12/2007 | Nathan | B60N 2/305 297/325 |
| 2008/0180236 | A1 | 7/2008 | Bosse | |
| 2013/0200668 | A1 | 8/2013 | Michalak et al. | |
| 2019/0381913 | A1* | 12/2019 | Banales Cano | B60N 2/0224 |
| 2020/0130702 | A1* | 4/2020 | Ferreira | H04W 4/48 |
| 2024/0042904 | A1* | 2/2024 | Kormos | B60N 2/14 |
| 2024/0217414 | A1* | 7/2024 | Jeon | B60N 2/79 |
| 2024/0375551 | A1* | 11/2024 | Han | B60N 2/02246 |

* cited by examiner

VEHICLE HAVING A CONTROLLED FOLDABLE SEAT

FIELD OF THE DISCLOSURE

The present disclosure generally relates to vehicle seating, and more particularly relates to controlling the folding of a seat on a motor vehicle to a stowed position.

BACKGROUND OF THE DISCLOSURE

Motor vehicles are commonly equipped with front and rear rows of seating. For example, the motor vehicle may include a front row of seating and one or more rear rows of seating. On some vehicles, the rear row seats may include a seat back that may be latched in an upright use position and may be folded forward and downward on top of the seat base to a stowed generally flat position by actuating a push button switch to unlatch the seat back which is spring biased forward and folded to the generally flat position. It may be desirable to provide for a seating system that controls the activation of the folding seat.

SUMMARY OF THE DISCLOSURE

According to a first aspect of the present disclosure, a vehicle has a seat with a seat base and a seat back that may fold from an upright seating position to a folded position, a user input to enter an input to move the seat back to the folded position, and at least one door moveable between an open position and a closed position. A door sensor detects the at least one door in the open position or the closed position and a controller is configured to control movement of the seat back from the upright seating position to the folded position. The controller determines whether the vehicle is not moving and whether the at least one door is in the open position or closed position. The controller permits activation of the seat back to move to the folded position when the input is received, the at least one door is in the open position and the vehicle is determined not to be moving, and prevents movement of the seat back to the folded position when the vehicle is moving or the at least one door is in the closed position.

Embodiments of the first aspect of the present disclosure can include any one or a combination of the following features:

- the at least one door comprises a rear door at a rear end of the vehicle;
- the rear door is a liftgate;
- at least one door comprises a rear side door;
- the rear side door is located proximate to a rear row of seating which is rearward of a front row of seating;
- the seat is a flip seat;
- the flip seat has a latch that is releasable to allow the seat back to flip forward with a bias spring;
- the seat back is moved via an actuator;
- the user input comprises a switch;
- the switch is located near a rear end of the vehicle; and
- the controller requires first and second attempted user inputs before moving the seat back to the folded position.

According to a second aspect of the present disclosure, a vehicle has a seat with a seat base and a seat back. The seat back may fold from an upright seating position to a folded position. A user input is included for entering an input to move the seat back to the folded position. The user input comprises a switch that is actuatable by a user. At least one door is moveable between an open position and a closed position. The vehicle has a door sensor for detecting the at least one door in the open position or the closed position and a controller configured to control the movement of the seat back from the seating position to the folded position. The controller determines whether the vehicle is not moving and whether the at least one door is in the open position or closed position. The controller permits activation of the seat back to move to the folded position when the input is received, the at least one door is in the open position and the vehicle is determined not to be moving, and prevents movement of the seat back to the folded position when the vehicle is moving or the at least one rear side door is in the closed position. The at least one door comprises a rear door at the rear end of the vehicle or proximate to a rear row of seating of the vehicle. The controller requires first and second attempted user inputs before moving the seat back to the folded position.

The present disclosure also includes a method of controlling the folding of a seat back of a seat in a motor vehicle. The method includes receiving a user input to move the seat back from an upright seating position to a folded position, detecting the at least one door in an open position or a closed position, determining whether the vehicle is moving or not moving, activating with the controller the seat back to move to the folded position when the input is received, the at least one door is in the open position and the vehicle is determined not to be moving, and preventing with the controller movement of the seat back to the folded position when the vehicle is determined to be moving or the at least one door is in the closed position.

Embodiments of the third aspect of the present disclosure can include any one or a combination of the following features:

- the steps of detecting first and second attempted user inputs before moving the seat back to the folded position;
- the user input comprises a switch;
- the switch is located near the rear end of the vehicle or proximate to a seat in a rear row of seating on the vehicle;
- the step of providing an output to a user indicative of preventing the folding of the seat back;
- the seat back moves from the upright seating position to the folded position via a bias spring when a latch is unlatched; and
- the movement of the seat back is provided with an actuator.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
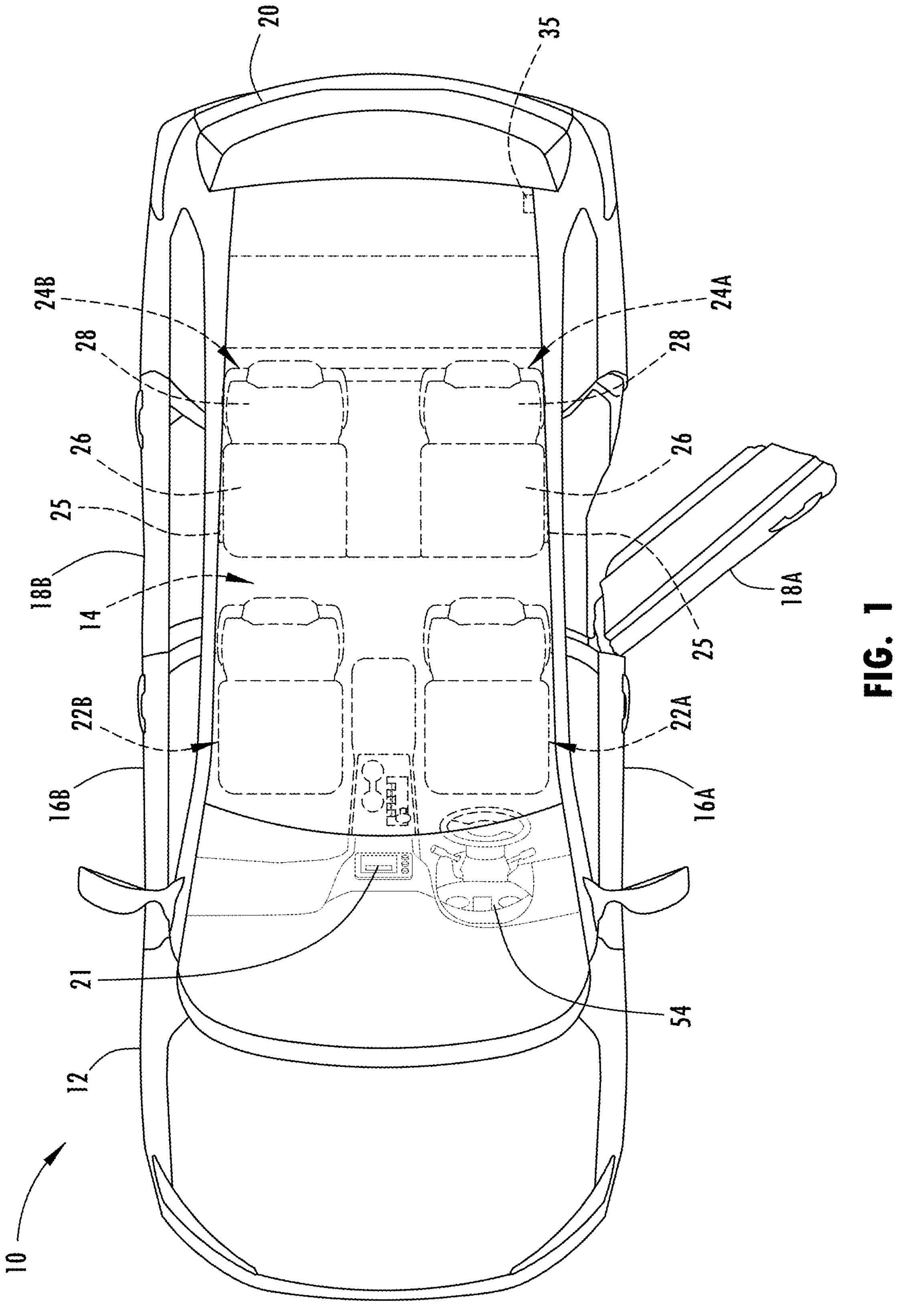
FIG. 1 is a top schematic view of a motor vehicle having a seating arrangement with a rear row of folding seats.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a seat with a controlled folding seat back. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
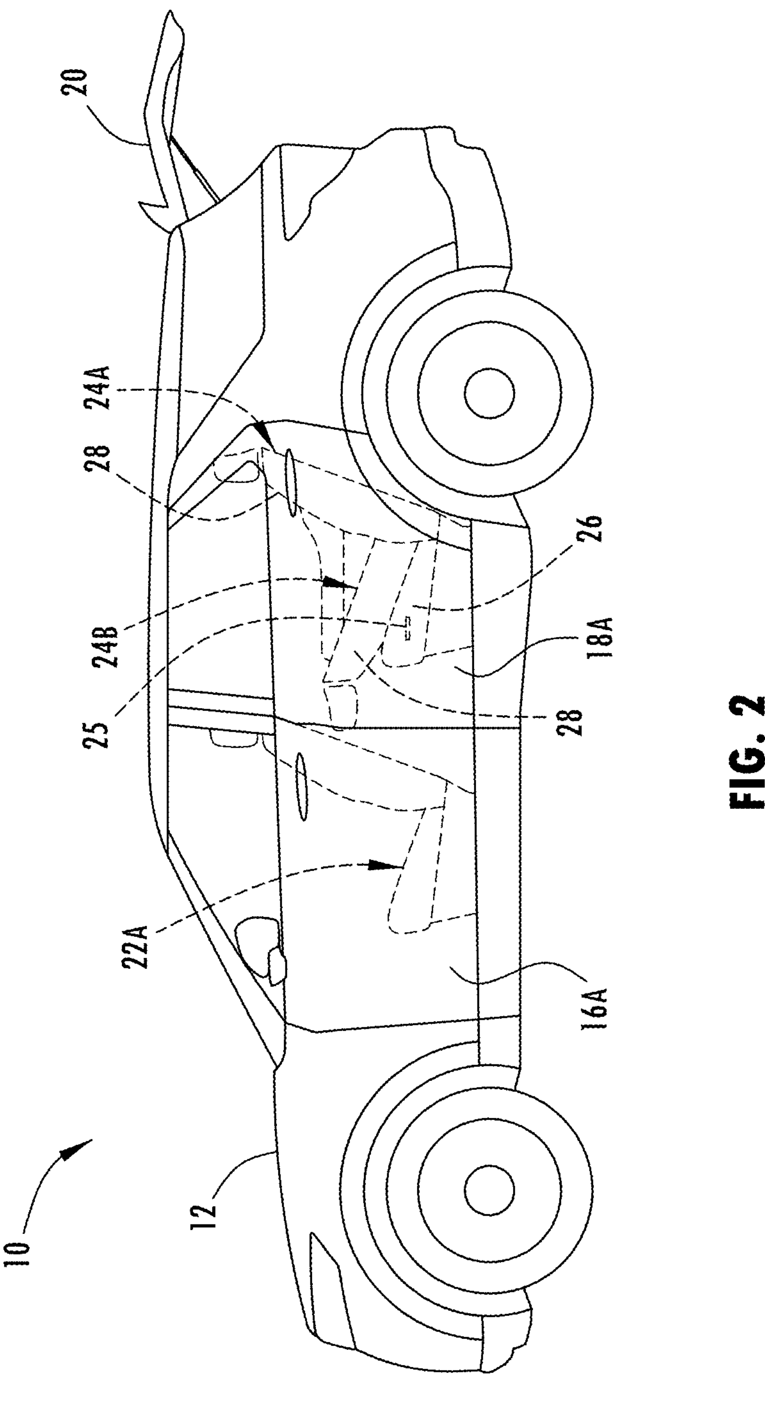
FIG. 2 is a sideview of the motor vehicle further illustrating the rear row of folding seats having one seat in a folded position and one seat in a use position.
Figure 3:
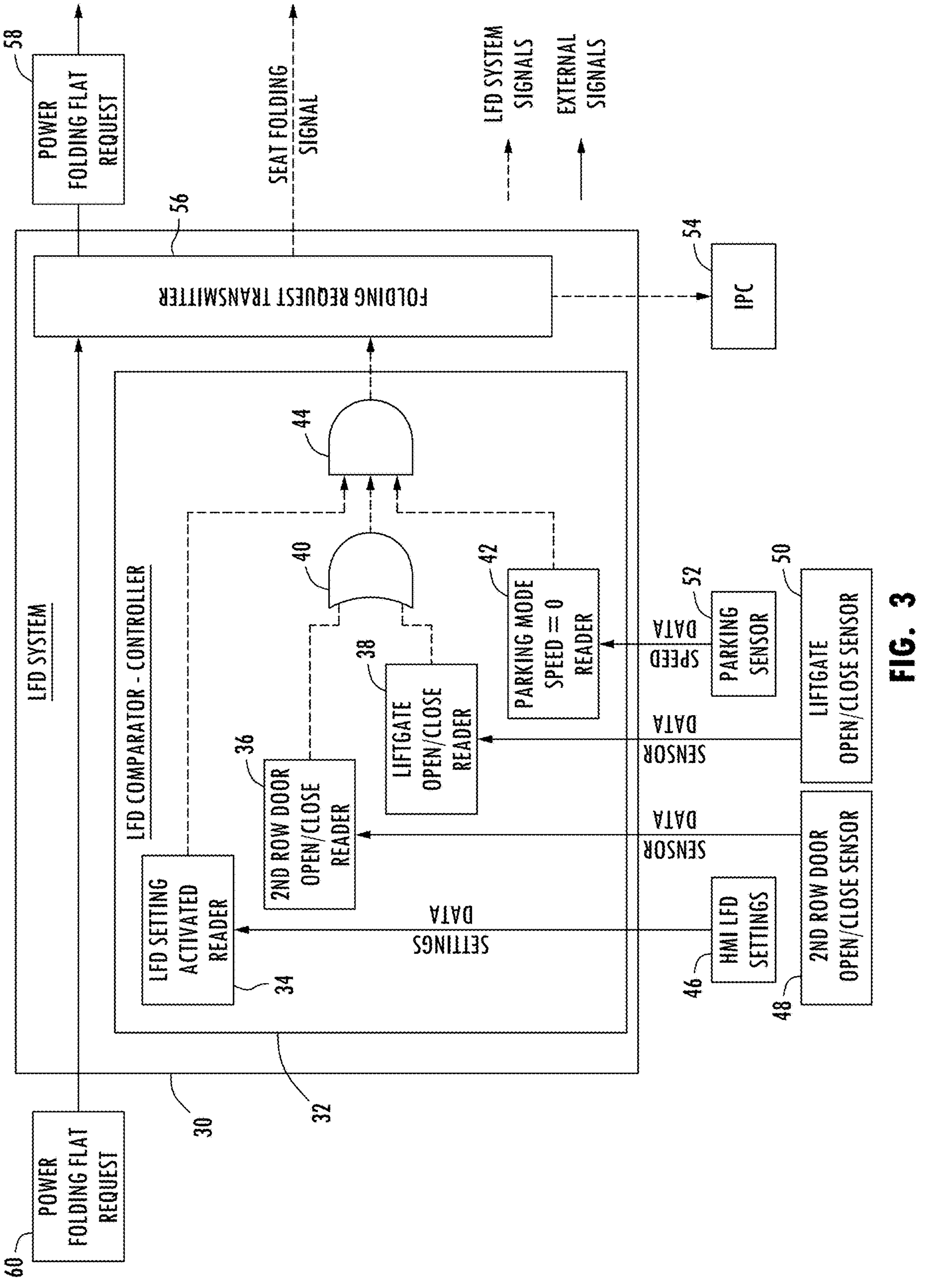
FIG. 3 is a block diagram illustrating a lock folding by default system for use in controlling the foldable seats.

Referring to FIGS. 1 and 2, a motor vehicle 10 is generally illustrated, in one example, in the form of a passenger sport utility vehicle (SUV) having a body 12 and a cabin interior generally defining a passenger compartment 14. The motor vehicle 10 shown and described herein is an SUV that includes the passenger compartment 14 equipped with a front row of seating having front row seats 22A and 22B and a second row of seating having rear row seats 24A and 24B. It should be appreciated that the motor vehicle 10 may include one or more seats in each row, and the motor vehicle 10 may further include more than two rows of seating. The body 12 includes a pair of front side doors 16A and 16B which are generally aligned with the front row of seating, and a pair of rear side doors 18A and 18B which are generally aligned with the second rear row of seating. The vehicle 10 further includes a rear end door in the form of a liftgate 20 located at the rear end of the motor vehicle 10. The rear end door may otherwise be configured as a trunk or a sideways rotating swing door or doors.

The front row of seating may include the front row seat 22A configured as a driver's seat generally located vehicle rearward of a steering wheel and foot pedal controls and may include a center console located between both front row seats 22A and 22B in the front row of seating. A display 21, such as a touchscreen display, may be located generally forward of the driver's seat. The display 21 provides a human machine interface (HMI) that may include user inputs and visual display outputs. It should be appreciated that the motor vehicle 10 may include other HMIs such as other displays, a microphone, and one or more speakers to provide audible communication. The first and second front seats 22A and 22B may include a seat base and a seat back that may be adjustable either manually or with powered actuators.

The second row of seating includes the second row seats 24A and 24B, each of which may be configured with a seat base 26 and a foldable seat back 28. The seat back 28 may be latched in an upright position referred to as the use or seating position. When either of seats 24A or 24B are not being used by a passenger or other object, the seat back 28 may be rotated forward and downward to a stowed folded flat position on top of the seat base 26. In order to move the seat back 28 to the folded flat position, the seat back 28 may be equipped with a latch that may be released via an actuator and a bias spring that spring biases the seat back 28 forward towards the folded flat position, according to one embodiment. According to another embodiment, the seat may include an actuator that actuates the seat back 28 to rotate from the upright seating position to the folded flat position. The actuator may include the use of an electric motor and a drive assembly.

The motor vehicle 10 is further equipped with seat control user input switches which, in the example shown, includes seat mounted switches 25 shown mounted on each of the rear seats 24A and 24B and a user input switch 35 located near the rear end of the motor vehicle 10 such as on an interior wall of the interior of the vehicle. Switches 25 and 35 may be a mechanical switch, touch switches or presented on a touchscreen display, for example. A user may actuate either of switches 25 and 35 as an input to cause the seat back 28 to unlatch to fold the seat back 28 to the folded flat position. According to an embodiment with an electric motor, the user input switches 25 and 35 may be actuated by a user to activate a motor to rotate the seat back to the folded flat position and in the reverse direction to move the seat back from the folded flat position to the seating position. In order to fold the seat back 28 to the folded flat position, a user may access the seat mounted switches 25 from either of the rear side doors 18A and 18B. A user may further access the user input switch 35 from the rear end of the motor vehicle 10 via the rear opening when the liftgate 20 is in the open position. As such, a user may activate either of switches 25 or 35 to cause the seat back 28 to fold from the seating position to the folded flat position to allow for a flat storage surface in the rear portions and/or mid portions of the motor vehicle 10.

The motor vehicle 10 is equipped with a lock folding by default (LFD) system 30 that controls the activation of the actuation of the folding of the seat back 28. The LFD system 30 includes a controller 32 which is shown in one example configured with logic comparative devices that includes logic gates. The controller 32 includes an LFD setting activated reader 34 that may be indicative of whether the LFD system 30 is activated. The controller 32 also includes a back door open/close reader 36 which detects whether each of the side rear doors is in the open or closed position. The controller 32 also includes a liftgate open/close reader 38 which detects whether the liftgate is in the open or closed position. The controller 32 compares the outputs of the rear side door open/closed reader 36 with the output of the liftgate open/close reader 38 using a logic OR gate 40 and generates an output signal. If any of the rear side door and trunk or liftgate is in the open position, the logic OR gate 40 provides an output signal to an AND logic gate 44. The AND logic gate 44 logically ANDs the output of the activated reader 34, the output of the OR gate 40 and a signal indicative of a parking mode speed equal to 0 (zero) from block 42. The parking mode signal 42 is received from a parking sensor 52 which provides speed and data. It should be appreciated that the rear side door signal may be sensed with a rear side door open/close sensor 48 and the liftgate open/close signal may be sensed with a liftgate open/close sensor 50. The activated reader signal is provided via an HMI LFD settings 46 which may be entered by a user, for example. It should be appreciated that the logic comparisons and decisions may be performed with other analog and/or digital circuitry such as with one or more processors.

The LFD system 30 includes a folding request transmitter 56 that receives an input signal from a power folding flat request 60 which may be entered via one of the user input switches 25 and 35 and the output of the controller 32 indicative of the motor vehicle 10 being in a parking mode with at least one of the rear side doors and liftgate in the open position and the LFD setting activated. The folding request transmitter 56 then generates a power folding flat request signal 58 and provides an output to the instrument panel cluster (IPC) 54.

Figure 4:
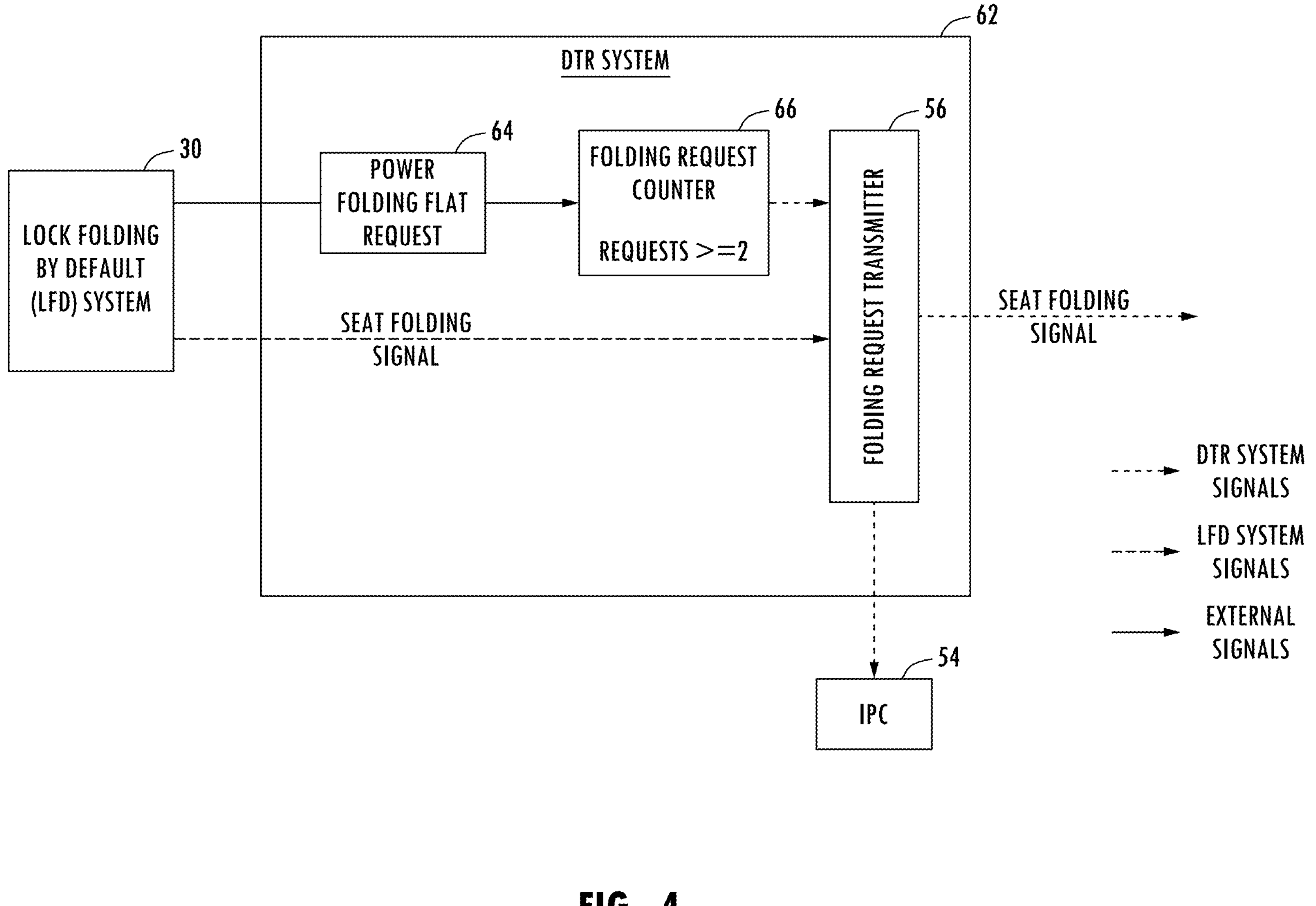
FIG. 4 is a block diagram illustrating a double tap reminder system for use in processing the lock folding by default output signal and generating a seat folding signal.

Referring to FIG. 4, a double tap reminder (DTR) system 62 is illustrated for further processing the output of the LFD system 30 to further generate the seat folding control signal. The DTR system 62 receives a power folding flat request at block 64 and has a folding request counter 66 which counts the number of taps or activations of the user input switch and determines when the number of user attempted switch inputs is greater than or equal to 2 (two). A folding request transmitter 56 then transmits a signal as the seat folding control signal when the folding request counter has had more than two or more activations.

Figure 5:
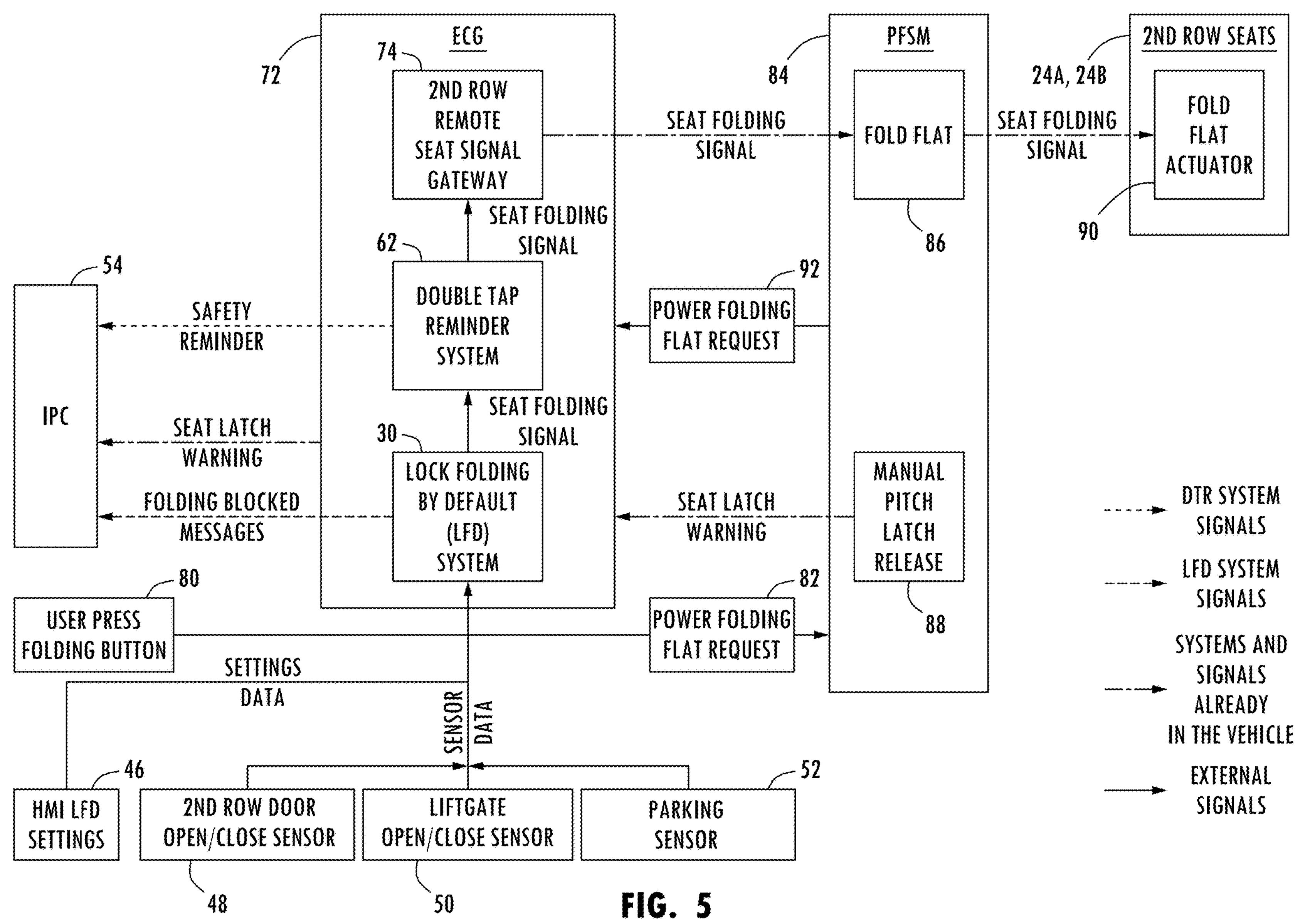
FIG. 5 illustrates a system for controlling the vehicle folding seats, according to one example.

In FIG. 5, the IPC 54 is further shown in communication with an Enhanced Central Gateway (ECG) 72 and a Power Folding Seat Module (PFSM) 84. The HMI LFD settings 46 and the second row door open/close sensor 48, liftgate open/close sensor 50 and parking sensor 52 are shown communicating with the ECG 72 and providing signals and data to the lock folding by default system 30. The LFD system 30 provides a seat folding signal to the double tap reminder (DTR) system 62 which in turn provides a seat folding signal to the second row remote seat signal gateway 74. Outputs of the LFD system 30 are also provided to the IPC 54 with folding block messages and the double tap reminder system 62 provides safety reminder signal to the IPC 54.

The PFSM 84 receives a seat folding control signal from the ECG 72 and generates a fold flat command 86 which is supplied to the fold flat actuator 90 in the corresponding second row seat 24A or 24B. In addition, the PFSM 84 generates a manual pitch latch release 88 as a seat latch warning which may be supplied to the ECG 72.

Figure 6A:
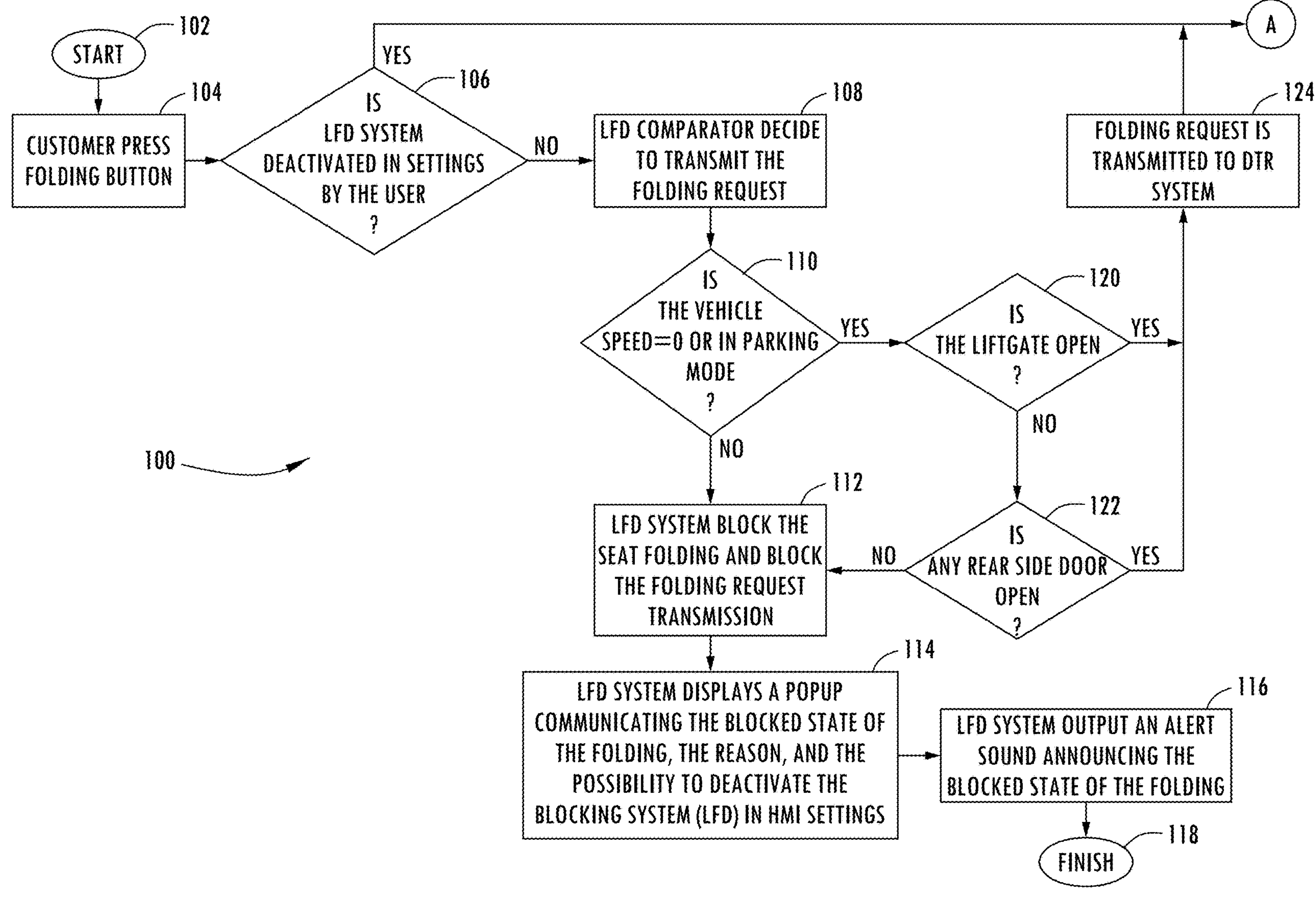
FIGS. 6A-6B illustrate a method for controlling the folding of a foldable seat in the vehicle, according to one embodiment.
Figure 6B:
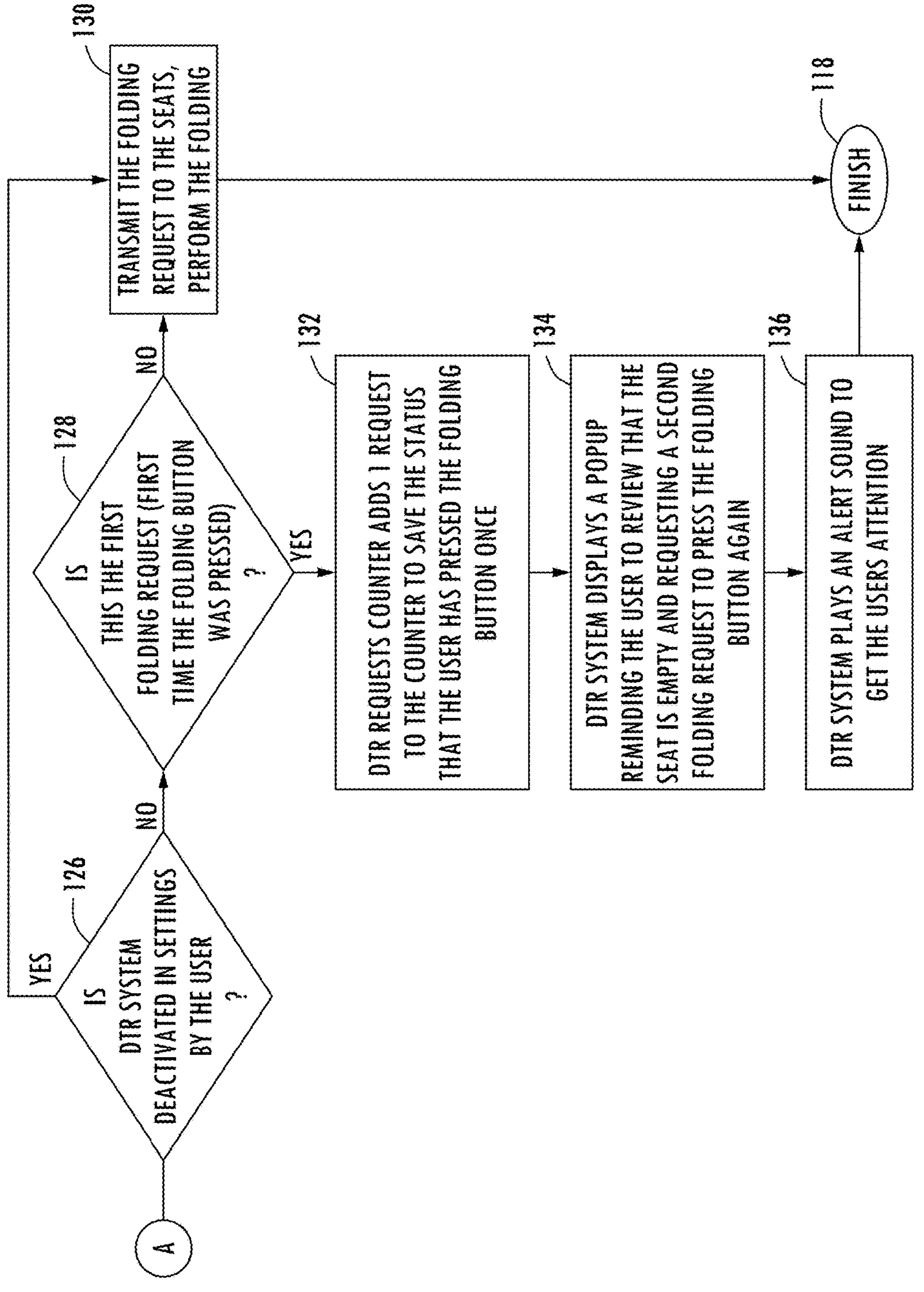

Referring to FIGS. 6A and 6B, a method of controlling and activating the folding of a seat back of a seat in the rear row of seats is illustrated, according to one example. Method 100 begins at step 102 and proceeds to step 104 to detect a customer pressing the seat folding user input switch button. Next, at decision step 106, method 100 determines if the LFD system is deactivated in settings by the user and, if so, proceeds to decision step 126. If the LFD system is not deactivated, method 100 proceeds to step 108 where the LFD comparator decides to transmit the seat folding request and then proceeds to decision step 110 to determine if the vehicle speed is equal to 0 (zero) or if the vehicle is otherwise in a parking mode. If the vehicle speed is not equal to 0 (zero) or if the vehicle is not in a parking mode, method 100 proceeds to step 112 where the LFD system blocks the seat folding and blocks the transmission of the folding request. Thereafter, method 100 proceeds to step 114 where the LFD system displays a popup message communicating the blocked state of the attempted seat folding, the reason, and the possibility to deactivate the blocking system of the LFD in HMI settings before proceeding to step 116 where the LFD system outputs an alert output sound announcing the blocked state of the seat folding, before finishing at step 118.

If the vehicle speed is equal to 0 (zero) or the vehicle is otherwise in a parking mode, method 100 proceeds to decision step 120 to determine if the liftgate is in the open position and, if not, proceeds to decision step 122 to determine if any of the rear side doors are in the open position. When none of the liftgate in the rear side doors are in the open position, method 100 proceeds to step 112 to block the seat folding and to block the seat folding request transmission. Otherwise, if either of the liftgate or the rear side doors are in the open position, method 100 proceeds to step 124 to transmit a seat folding request to the DTR system. Next, method 100 proceeds to decision step 126 to determine if the DTR system is deactivated in settings by the user and, if so, transmits the folding request to the seats and performs a seat folding at step 130 before finishing at step 118. If the DTR system has not been deactivated in settings by the user, routine 100 proceeds to decision block 128 to determine if this is the first folding request for the first attempt to fold the system with the user input switch button being pressed one time and, if not, proceeds to transmit the folding request to the seats and perform the folding at step 130 before finishing at step 118. If this is the first folding request, method 100 proceeds to step 132 where the DTR requests the counter add one count request to the counter to save the status if the user has pressed the folding button once. Next, method 100 proceeds to step 134 where the DTR system displays a popup reminding the user to view that the seat is empty and requesting a second folding request to press the folding button again. Finally, method 100 proceeds to step 136 where the DTR system plays an alert sound to get the user's attention before finishing at step 118.

Accordingly, a motor vehicle 10 is advantageously provided with a folding seat 24A or 24B that is controlled to move the seat back 28 to the folded position when the motor vehicle 10 is not in use, such as when the vehicle is in park, and at least one of the rear side doors and rear door, such as a liftgate, is in an open position. Thus, under certain circumstances, inadvertent actuations of the seat back 28 of the seat of the motor vehicle 10 may be reduced or prevented.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:

a seat having a seat base and a seat back, wherein the seat back may fold from an upright seating position to a folded position;

a user input for entering an input to move the seat back to the folded position;

at least one door moveable between an open position and a closed position;

a door sensor for detecting the at least one door in the open position or the closed position; and a controller configured to control movement of the seat back from the upright seating position to the folded position, wherein the controller determines whether the vehicle is not moving and whether the at least one door is in the open position or closed position, and wherein the controller permits activation of the seat back to move to the folded position when the input is received, the at least one door is in the open position and the vehicle is determined not to be moving, and blocks transmission of a seat folding request to prevent movement of the seat back to the folded position and outputs a message when the vehicle is moving or the at least one door is in the closed position.

2. The vehicle of claim 1, wherein the at least one door comprises a rear door at a rear end of the vehicle.

3. The vehicle of claim 2, wherein the rear door is a liftgate.

4. The vehicle of claim 1, wherein the at least one door comprises a rear side door.

5. The vehicle of claim 4, wherein the rear side door is located proximate to a rear row of seating which is rearward of a front row of seating.

6. The vehicle of claim 1, wherein the seat is a flip seat.

7. The vehicle of claim 6, wherein the flip seat has a latch that is releasable to allow the seat back to flip forward with a bias spring.

8. The vehicle of claim 1, wherein the seat back is moved via an actuator.

9. The vehicle of claim 1, wherein the user input comprises a switch.

10. The vehicle of claim 9, wherein the switch is located near a rear end of the vehicle.

11. The vehicle of claim 1, wherein the controller requires first and second attempted user inputs before moving the seat back to the folded position.

12. A vehicle comprising:

a seat having a seat base and a seat back, wherein the seat back may fold from an upright seating position to a folded position;

a user input for entering an input to move the seat back to the folded position, wherein the user input comprises a switch that is actuatable by a user;

at least one door moveable between an open position and a closed position;

a door sensor for detecting the at least one door in the open position or the closed position; and a controller configured to control the movement of the seat back from the seating position to the folded position, wherein the controller determines whether the vehicle is not moving and whether the at least one door is in the open position or closed position, and wherein the controller permits activation of the seat back to move to the folded position when the input is received, the at least one door is in the open position and the vehicle is determined not to be moving, and blocks transmission of a seat folding request to prevent movement of the seat back to the folded position and outputs a message when the vehicle is moving or the at least one rear side door is in the closed position, wherein the at least one door comprises a rear door at the rear end of the vehicle or proximate to a rear row of seating of the vehicle.

13. The vehicle of claim 12, wherein the controller requires first and second attempted user inputs before moving the seat back to the folded position.

14. A method of controlling the folding of a seat back of a seat in a motor vehicle, the method comprising:

receiving a user input to move the seat back from an upright seating position to a folded position;

detecting the at least one door in an open position or a closed position;

determining whether the vehicle is moving or not moving;

activating with the controller the seat back to move to the folded position when the input is received, the at least one door is in the open position and the vehicle is determined not to be moving;

blocking transmission of a seat folding request to prevent with the controller movement of the seat back to the folded position when the vehicle is determined to be moving or the at least one door is in the closed position; and outputting a message when the seat folding request is blocked.

15. The method of claim 14, further comprising the steps of detecting first and second attempted user inputs before moving the seat back to the folded position.

16. The method of claim 14, wherein the user input comprises a switch.

17. The method of claim 16, wherein the switch is located near the rear end of the vehicle or proximate to a seat in a rear row of seating on the vehicle.

18. The method of claim 14, further comprising the step of providing an output to a user indicative of preventing the folding of the seat back.

19. The method of claim 14, wherein the seat back moves from the upright seating position to the folded position via a bias spring when a latch is unlatched.

20. The method of claim 14, wherein the movement of the seat back is provided with an actuator.

* * * * *